July 18, 1939.  P. KELLNER  2,166,159
BAKER'S MACHINE FOR CUTTING AND SPREADING THE CUT PORTIONS
Filed Sept. 3, 1937  2 Sheets-Sheet 1

INVENTOR
Paul Kellner

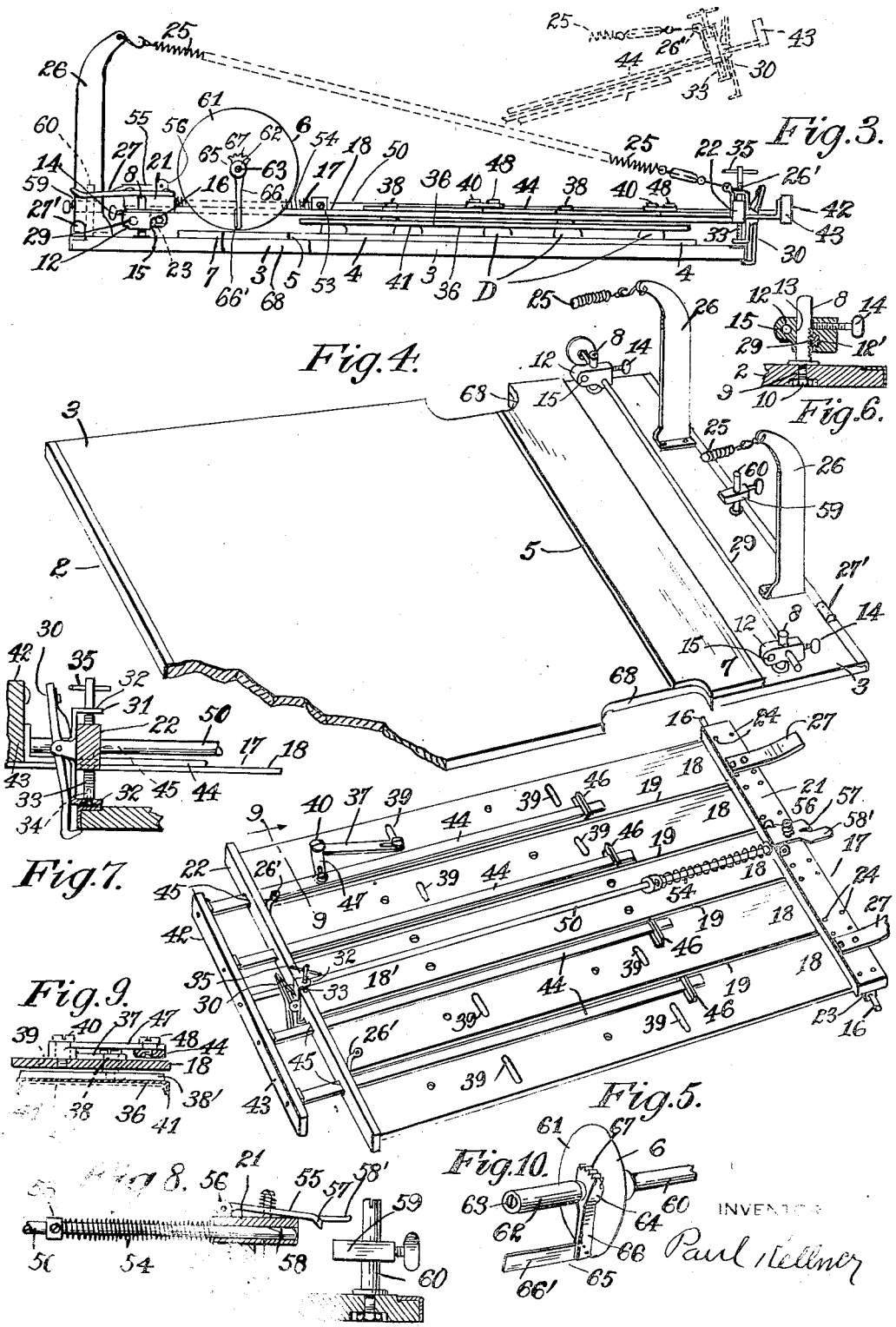

Patented July 18, 1939

2,166,159

UNITED STATES PATENT OFFICE 2,166,159

BAKER'S MACHINE FOR CUTTING AND SPREADING THE CUT PORTIONS

Paul Kellner, New York, N. Y., assignor to American Machine & Foundry Company, a corporation of New Jersey Application September 3, 1937, Serial No. 162,262

15 Claims. (Cl. 107—22)

This invention relates to machines for use in bakeries. It is designed for cutting strips or layers of dough and the spreading of the cut portions, so the same take a separated position.

This process is performed on a peel board, of which a number are employed, with a series of strips or layers of prepared dough arranged in the proper position thereon. The peel board, brought to the machine thus prepared, is placed in position on a foundation of the machine, under an upper lifting from that is normally in the lifted position to enable the ready entrance thereunder. The upper frame is then swung down on the dough strips to crease and lightly clamp the same, and the frame is locked down by a suitable catch.

A cutting roller, which has an idle position at the rear of the machine, while the work is thus progressing, is drawn forward and back over the strips, severing same into sections. Clamping members of the top frame are arranged to have a sidewise movement imparted thereto, transverse to the cuts, by a push frame, which the operator engages with his body by a forward push, leaving his hands free for other work, or he may use his hands if desired. The movement of the push frame, through bell crank levers, moves the clamping members and the severed pieces to uniformly separated positions. The clamping members are locked in the spread position during the lifting movement of the top frame, which is unlocked at the time the push frame and clamping members are locked in the spread position, releasing the top frame, which, by suitable spring mechanism, is lifted and returned to its normal open position. On reaching the normally uplifted position, the catch, that holds the clamping members in the spread position, is unlocked, and the clamping members also return, by a spring mechanism, to their normal clamping position. The work holder, and the work in the spread position, is then removed from the foundation, and another peel board with the strips or layers of dough is placed in position, and the process repeated.

The object of the invention is: to provide a simple machine that is efficient and reliable in its action, inexpensive to produce, and, as will be shown hereafter, to be a labor saving device.

Other objects will be disclosed as this description proceeds, and will be fully claimed, and more particularly pointed out in the drawings, hereto annexed.

Figure 1 is a plan view of my machine, showing the lifting frame locked down on the work, and ready to draw the cutting roller forward, to sever the dough strips, and return the roller to its idle position.

Figure 2 is a similar view, and shows an advanced position of the working parts; after the work has been severed, and how the work is moved to separate the cut sections, by a push frame, operated either by hand or by the body of the operator. The final inward position of the push frame releases the catch which holds the lifting frame down, which by the spring mechanism elevates the same to the work receiving position, and ready to receive another peel board.

Figure 3 is a side elevation of the machine, as seen looking upward of Figures 1 and 2, and shows the upper frame, in solid lines, in its clamping position on the work, and indicated by broken lines, the lifted position of the top frame.

Figure 4 is a detail view in perspective, of the main supporting frame, and showing some of its working parts.

Figure 5 is a detail view of the upper frame, also shown in perspective, and further shows the push frame, and the locking catches.

Figure 6 is a detail view of one means of regulating the height of the lifting frame for different thicknesses of work.

Figure 7 is a detail view of the catch to hold the lifting frame down on the work during the cutting of the strips, and the spreading of the same.

Figure 8 is a detail view of the catch, to lock the push frame to its inward position, and the clamping members in their spread position.

Figure 9 is a detail view of a rail, a part of the top frame, under which the clamping members are supported, and actuated by the bell crank levers. The view is a section taken on line 9—9 of Figure 5.

Figure 10 is a view of the cutting roller, and shows a scraper, movably attached, used to remove the waste portions cut from the ends of the dough strips.

Figure 1:
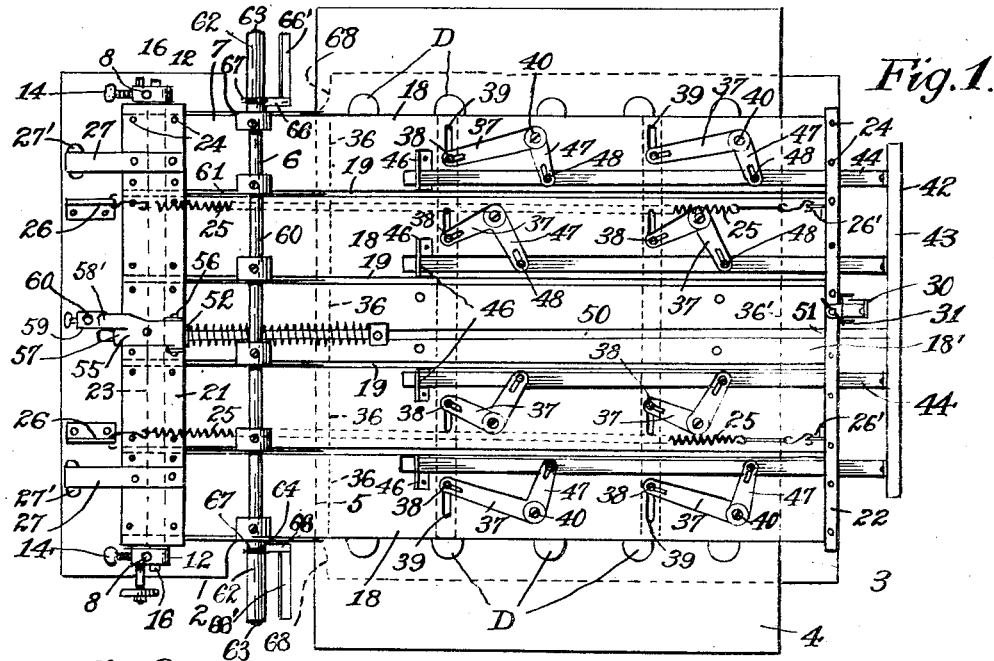

As shown in the drawings, the lower frame, indicated by 2, is preferably made up of a suitable base board 3 to provide a platform on which the peel boards, holding the work, are adapted to rest. These peel boards 4 engage a stop 5 at the rear of the base board, and are gauged for proper location laterally by the operator. The dough strips D, carried by the boards, will register with the cutting roller 6, which, at the start of the work operation, is in the idle position at the rear of the machine, on a support 7 having the same height as the peel boards 4, the front face of which is the stop 5.

The lower frame board 3, has arranged thereon, at the rear, upstanding studs 8, one at each side of the frame, suitably supported in bores 9 and held therein by nuts 10 to reduced shouldered threaded ends of the studs. On these studs is mounted for adjustment, upward and down, bearing members 12, having bores 13 to fit the studs, and binding screws 14 to hold the bearings in adjusted position on the studs.

Transversely to the bores 13 and spaced therefore are bores 15 in which the ends 16 of a rock shaft of the upper frame is pivotally carried. The upper frame 17 is made up of parallel strips 18 of suitable width, so spaced apart to provide runways 19 between the strips 18 for the cutting roller 6. The blades of the cutting roller are quite thin to pass through these runways, and the runways guide the cutting roller in its path of movement. The strips 18 are supported at each end by cross bars 21—22, preferably of wood, to act as buffers for the cutting roller. The one at the rear 21 has the rock shaft; a square rod 23, bolted thereto, the ends of which form the pivot members 16, turned to fit the bores 15 of the bearings, on which this upper frame may swing to its elevated position, and down to the work clamping position. To these bars 21—22 the strips 18 are fixed by screws 24 of the proper spacing, as stated.

The frame is elevated by a suitable spring mechanism, so that the front end of the frame is free to enable the entrance of the peel boards thereunder, with the work thereon, as here shown, a pair of coil springs 25—25 are employed to lift the frame. These springs are mounted at one end in eyes at the top of standards 26, located at the rear of the base board 3, and the other ends of the springs to short brackets 26, fixed to the front end of the top frame to the cross bar 22.

By this construction the top frame is normally held elevated, and limited in its lifted movement by stop arms 27, bolted to the rear cross bar 21, that engage rubber bumpers 27.

The work to be cut and spread may vary in thickness. It is therefore desirable to regulate the space under the top frame, which may be done by elevating the hinge point on which the frame swings. The bearing members 12 are bored to receive a shaft 29 that extends across the machine, and has a pinion cut therein at each end to engage rack teeth, cut in the studs 8. A hand wheel at one end of the shaft will enable the rotation of same and thereby raise and lower the bearing members uniformly to the height required at the rear end of the top frame. When the upper frame is moved down on the work, it is preferably locked down, and for this purpose a locking catch is arranged on the front bar 22. This catch may likewise be adjusted to engage in any position thereof with its co-acting locking member, and in parallel relation with the rear adjustment of the frame. The catch, indicated by 30, and best seen in Figure 7, is pivoted to a sliding bracket 31 having ears extended forward in which the catch 30 is pivoted, and ears bent rearward, as at 32, one at the top, and one at the bottom. A threaded rod 33 passes through the ears, and threaded in the cross bar 22 the lower end of the rod 33 is reduced to fit the bore in the lower ear, free to rotate therein, and a headed screw 34 in the end of the rod to hold the ear in position on the rod, yet free to rotate.

The rod has a finger piece 35 by which it may be rotated. The regulation of the rod will raise and lower the latch, the bracket, and the bottom thereof, in any adjusted position, will rest on the base board 3 and form a stop for the down position of the frame.

The peel boards 4, as already described, have the work, indicated at D, in the form of layers or strips of the proper size and proportion placed in position thereon. Five layers are here shown, but any number may be so arranged. Placed transversely on the machine, parallel to the cutting roller 6, the work will be severed by the cutting knives. The cutting roller is rolled forward, after the upper frame has been lowered on the work and locked by the catch 30, and guided between the strips 18 in the runways 19 cutting the layers into sections, and trimming both ends.

The work is engaged by contact members 36 during the clamping and cutting thereof, which are movably supported by the strips 18 and are located under the same. These contact members are of a length to fully engage over the five layers, one under each strip 18, as shown, and are of channel formation, see Figure 9. The one under the central strip 18 is fixed to the strip and is not movable, while the others at each side thereof are adapted to be moved to predetermined distances outwardly and in opposite directions from the central fixed contact member. The contact members are carried by the ends of bell crank levers 37 by means of shouldered screws 38 which pass through elongated slots 39 in the strips 18 that guide the contact members in a movement transverse to the strips 18. The screws are threaded in the contact plates, in a reinforced portion thereof, as at 38, in a manner to hold the contact members close to the underside of the strips 18 yet free to move.

Each movable contact member 36 is carried by two bell cranks 37 similarly connected. The bell cranks are pivoted to the top of the strips 18, as at 40 on which they swing, and by said screws 38 support the contact members under the strips 18. The bell cranks (eight of which are shown, four at one side of the center strip, and four on the other), are arranged in sets, as right and left, to move in opposite directions.

The channel members 41, all of which are of channel formation, are lined on their undersides with cloth to prevent sticking to the dough. They crease the work when the upper frame is lowered on same, and when the cutting roller is drawn forward and returned will sever the layers between these creases. As will be seen the contact members with the channel portions now have these cut sections engaged at each end of the cut part, by which they are shifted laterally and transversely to a uniformly spread position on the peel board. This is done by rocking the bell cranks with a push frame, indicated at 42, which includes a push bar 43. The push bar is located forward of the lifting frame, and supported on connecting bars 44 that are slidably arranged in guide bearings 45, in the front cross bar 22, and bearing members 46 on the strips 18.

The connecting bars 44 engage one arm 47 of the bell cranks by pivot screws, as at 48, two for each contact member, which rock the bell cranks when the push bar is pushed inward, and thereby shift the contact members outwardly. The cut sections are thereby shifted to uniformly spaced positions, as will be readily understood.

The center cut section of the five layers remains in its cut position, and the two cut sections, at each side of each layer of the center one, are moved by the contact members; by the flanged edges of these members 41 which have made the creases therein, when the top frame is clamped down thereon. They are now moved in opposite directions, and the sections nearest the stationary center one, move only half the distance of the outer sections, due to proper proportions of the bell crank levers. The outer ones have longer shifting arms than the inner ones, whereby all the sections are uniformly positioned.

Figure 2:
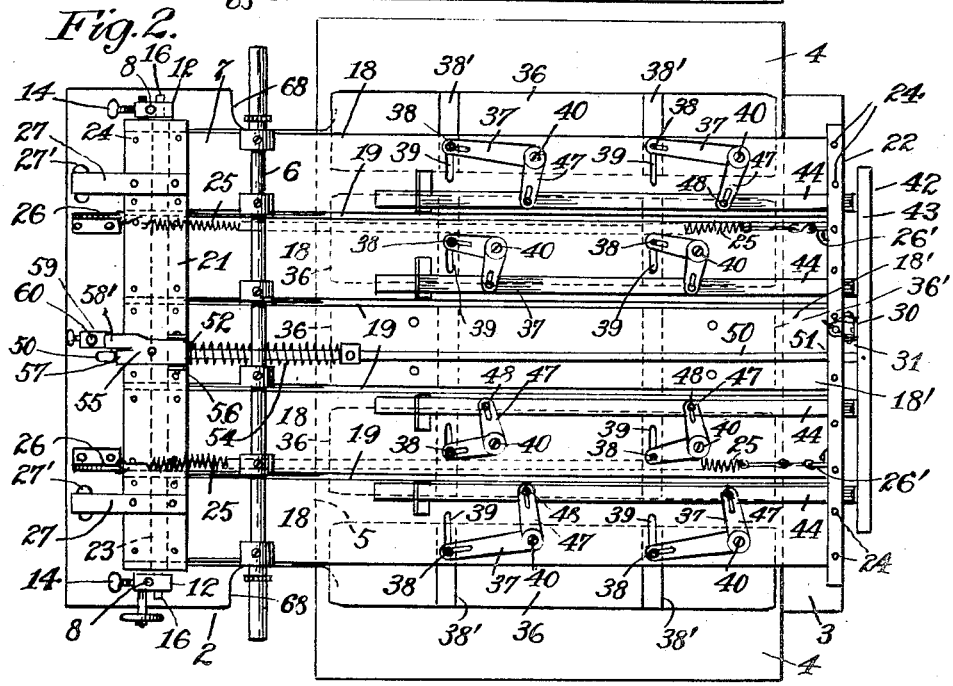

When the push frame 42 is fully pushed inward, and the contact members 36 fully spread by this movement, it is desirable to lock the contact members in this position. This is done by a sliding rod 50 fixed at one end to the push bar 43 passing through bearings 51—52 in the cross bars 21—22, similar to the connecting rods 44, between the cross bar 21, and a collar 53 on the rod 50. A spring 54 is interposed which holds the push bar normally outward and the contact members in the unspread position, see Figure 1. When pushed inward, see Figure 2, it holds the contact members spread, and in this position they are locked, by a latch 55 on the cross bar 21, located at the rear of the machine. Pivoted to a bracket 56, the latch extends rearward with a pawl like end 57, which is bent downward to engage a notch 58. The notch is cut in the rod 50, see Figure 8, which when moved forward will prevent the return of the push rod and frame. At the same time the rod is so locked that the latch 30, at the front of the machine, which holds the frame down, is released by the push bar 43, which engages the upper end of the latch 30 on the full movement inward of the push frame, see Figure 7. The top frame, now being free from its locked down position, will be lifted by the springs 25—25 and engage the bumper stops 27. At this moment, the catch 57 is withdrawn from the notch 58 in the rod 50 by an end 58 of the latch, engaging an adjustable stop 59 which is mounted on a short upright rod 69, fixed to the rear of the machine. The stop is made adjustable to suit the variable positions of the top frame, when elevating or lowering the same, for various thicknesses of work. On the release of the latch 55 the contact members return to their closed and unspread position.

The cutting roller 6, see Figure 3, includes a shaft 60 on which the cutting knives 61 are mounted, and fixed to the shaft in proper spacing in order to ride properly in the runways 19 of the top frame. The shaft at each end is reduced to receive handles 62 loosely mounted, and held in position thereon by screws 63 at both ends. The handles at the inner end of the shaft also have reduced portions on which are loosely mounted hubs 64 of scraper members 65. These have arms 66 carrying blades 66, that, by a knurled thumb portion 67, may be rocked on the handles while drawing the cutting roller forward to clear the ends of the layers, that part being the waste portion. On the return trip of the roller to its idle position, these scrapers are rocked to engage the waste ends, and sweep them from the peel board 4. That waste part drops into baskets not shown) through cutout portions of the base board 3 as indicated at 68.

The operation of the machine is substantially as follows: Suitable work holding racks (not shown), located one at each side of the machine; one to hold a supply of peel boards to be put through the machine, and the other to receive the finished work. With the strips or layers of dough properly positioned on the peel board the operator places one at a time on the platform of the machine, under the normally lifted position of the top frame 17. With the contact clamping members 36, also in their normally close position, the top frame is then pulled down to the stop, which is a part of the locking latch 30 and locks the frame down on the dough strips. The top frame, however, is not too tight on the dough strips, but just sufficiently so that the flanged edges 41 of the contact members 36 will make a full crease on same.

The cutting roller 6 is now rolled forward and back in the runways 19, formed between the brace rails 18 of the top frame. By this action the dough strips D are severed, at the same time swinging the scraper blades 66, on the forward stroke of the cutting roller to clear the overhanging ends of the strips, and on the return trip, the scrapers are turned down to engage these waste ends, and remove the same from the peel board, through the cutouts 68, at the rear of the machine.

The push bar 43 is now pushed inward and the contact members are shifted laterally, with the severed sections of the dough strips, to spread the same. This movement unlocks the latch 30 in front, and at the same time, at the end of this movement, the contact members are locked in their spread position by the latch 53 in rear. The top frame is now free to lift, which is done automatically by the springs 25—25 leaving the severed portions of the dough spread and uniformly spaced on the peel board, which is resting on the supporting platform. The latch 55 in the rear is again unlocked as the top frame reaches the desired lifted up position, and the contact members are released to return to their normally closed position through the action of the spring 54. The peel board with the finished work is then removed to the receiving rack, and the operation is repeated.

Variations in the manner of constructing my machine may be resorted to without departing from the scope of the invention as, for instance, instead of the center brace rail 18, under which a stationary contact member 36 is positioned, because of cutting of the dough strips into an odd number of five sections, as is here done, the dough strips may be cut in an even number of sections. There may be four or six sections, and all the contact members, on either side of the center of the dough strips, moved in opposite directions to spread the same.

Having described my invention I claim:

1. A machine of the class specified, comprising a lower supporting frame, of platform formation, and an upper frame carried by said lower frame arranged to have movement to and away from the platform, for the introduction between said frames of a work holding member, and means to normally hold the upper frame in the elevated position, and means to lock the upper frame down on the work, a cutting roller, having a normal inactive position on the lower frame at the rearward end thereof, adapted to be rolled forward and back, across the work on said work holder to sever the work into sections, means carried by the upper frame to guide the cutter roller in its movement forward and back, and means carried by said frame to shift the severed sections to spread the same transversely of the cuts, means to actuate the shifting means, and means to lock the shifting means in the spread position, and means connected with the means to actuate the shifting means, to unlock the upper frame at the end of the spreading and shifting motion, whereby the upper frame may lift, by said elevating means, and means to unlock the shifting means from their spread position, at the end of the lifting motion of the upper frame.

2. A baker's machine for cutting strips of dough into sections and spreading the same, comprising a lower frame, adapted to support a work holder, and a movable upper frame, having a hinged connection with the lower frame, to raise and lower the same with relation to the work holder, means to lock the frame in the work holding position, means to sever the work into sections, means to spread the cut sections, means to lock the spreading means in the spread position, means connected with the spreading means to unlock the upper frame from its locked position at the end of the movement of the spreading means, means to lift the top frame, means to unlock the spreading means at the end of the lifting movement, whereby the spreading means returns to its normal unspread position.

3. A machine of the class specified, comprising a lower supporting frame, of platform formation, and an upper frame carried by said lower frame arranged to have movement to and away from the platform, for the introduction between said frames of a work holding member, and means to normally hold the upper frame in its elevated position, and means to lock the upper frame down on the work, a cutting roller, having a normal inactive position on the lower frame at the rearward end of the machine, adapted to be manually rolled forward and back across the work on said work holder to sever the work into sections, means carried by the upper frame to guide the cutting roller in its movement forward and back, means carried by said upper frame to shift the severed sections to spread the same transversely of the cuts, including plate like contact members having creasing portions to form creases in the work, between which the cuts are made, and provide engaging edges on the work, whereby the same may be shifted by said creasing members, means to actuate the shifting means, and means connected with the shifting means to unlock the upper frame, means to lift the upper frame, and means connected with the shifting means to lock the work shifting members in their spread position, and means to unlock the work shifting members from their spread position at the end of the lifting movement of the top frame.

4. A baker's machine for cutting strips of dough into sections and spreading the cut sections, comprising a lower frame, adapted to support a work holder, and a movable upper frame having a hinged connection therewith to raise and lower the same with relation to the work holder, means to lock the upper frame in the work holding position, a cutting roller adapted to be rolled forward and back across the work to be cut, means to normally hold the upper frame in an elevated position free of the work holder, means connected with the upper frame to guide the cutting roller along its path of movement, across the work, means carried by the upper frame, such as contact members, adapted to crease the work and make contact with the work to hold the same during the cutting thereof, means to shift the contact members and thereby the work transversely of the sections, means connected with said contact shifting means to unlock the upper frame, which returns to its normal elevated position, means to lock the shifting means in the shifted and spread position, and means to unlock the shifting means at the end of the lifting movement of the top frame, means to adjust the hinge connection of the upper frame to varying heights of work supported on the work holder, and means to regulate the locking means to lock the upper frame on the work, for different heights of work, substantially as specified.

5. A machine of the class specified, comprising a lower supporting frame, of platform formation, and an upper frame carried by said lower frame, arranged to have movement to and away from the platform, for the introduction between said frames of a work holding member, and means to normally hold the upper frame in the elevated position, and means to lock the upper frame down on the work, and means to adjust the frame and said locking means to varying heights of work, a cutting roller, having a normal inactive position on the lower frame at the rearward end of the machine, adapted to be rolled forward and back, across the work on said work holder to sever the work into sections, means carried by the upper frame to guide the cutter roller in its movement forward and back, and means carried by said frame to shift the severed sections, to spread the same transversely of the cuts, means to actuate the shifting means, and means connected with the shifting means to unlock the upper frame, means to lock the shifting means in the spread position, which on the lifting movement of the top frame is unlocked, to assume its normal closed position, means carried by the cutting roller, adapted to be swung out of the path of the end portions of the dough strips, on the forward motion of the cutting roller, and turned downward to engage these ends, or waste portions, or the return of the roller, and brush the same from the peel boards, substantially as specified.

6. A baker's machine for cutting dough strips into sections, by heavily creasing the same to separate the strips, and spreading the sections to uniform separated positions, comprising a lower supporting frame adapted to hold a work holder, and a movable upper frame, having a hinged connection with the lower frame to raise and lower the same, with relation to the work holder, means carried by the upper frame to crease and cut the work into sections, means carried by the upper frame to spread the sections, means to actuate the spreading means, and means to lift the upper frame free of the work.

7. A baker's machine for cutting dough strips into sections comprising a lower supporting frame adapted to hold a work holder, and a movable upper frame having a connection with the lower frame by which to raise and lower the upper frame with relation to the work holder; means carried by the upper frame to cut the work into sections; other means carried by the upper frame to space the sections; and means to actuate the spacing means.

8. Mechanism for dividing and spacing dough; said mechanism comprising a lower frame; an upper frame mounted above said lower frame and movable relatively thereto; means to separate said upper frame from said lower frame to permit insertion between them and removal therefrom of a holder having thereon the material to be divided into portions, said upper frame being adapted to be closed upon said material to hold it for division; a gang of cutters movable relatively to said upper frame and holder to part the dough; and devices carried by said upper frame and movable laterally relatively to each other to space the divided portions of dough.

9. Dough dividing mechanism having the features claimed in claim 8, wherein the spacing means operate independently of the cutters.

10. Dough dividing mechanism having the features claimed in claim 8, wherein said gang of cutters consists of a single row of cutters mounted on a shaft and movable out of the range of action of the spacing devices while the latter operate.

11. Dough dividing mechanism having the features claimed in claim 8, wherein said gang of cutters consists of a single row of cutters mounted on a shaft and movable out of the range of action of the spacing devices while the latter operate, and readily removable as a unitary structure from said mechanism.

12. Mechanism for dividing and spreading dough; said mechanism comprising a lower frame; an upper frame mounted above said lower frame and movable relatively thereto; means to separate said upper frame from said lower frame to permit insertion between them, and removal therefrom, of a holder having thereon the material to be divided into portions, said upper frame having guiding means for a gang of cutters to be moved relatively to said frames along parallel paths to divide the material on said holder, and said upper frame being adapted to be closed upon said material to hold it for division; and devices carried by the upper frame and movable laterally relatively to each other to separate in a lateral direction the divided portions of dough held by said movable parts.

13. Mechanism for dividing and spacing dough; said mechanism comprising a lower frame; an upper frame mounted above said lower frame and movable relatively thereo; means to separate said upper frame from said lower frame to permit insertion between them and removal therefrom of a holder having thereon material to be divided into portions, said upper frame being adapted to be closed upon said material to hold it for division; and devices carried by said upper frame and movable relatively thereto, operating respectively throughout the entire area between said frames which may be occupied by said dough, to cut the dough into pieces, and to space the cut pieces of dough laterally of the path of said devices.

14. As a new article of manufacture, a gang of cutters adapted for use in a dough dividing and spreading mechanism having the features claimed in claim 8, said gang comprising disks mounted in spaced relation side by side on a shaft provided at each end with parts extended beyond the gang and adapted to serve as handles, and devices carried by said extended shaft ends for clearing away waste trimmed from the material during operation of the gang.

15. As a new article of manufacture, a gang of cutters adapted for use in a dough dividing and spreading mechanism having the features claimed in claim 8, said gang comprising disks mounted in spaced relation side by side on a shaft provided at each end with parts extended beyond the gang and adapted to serve as handles, and devices carried by said extended shaft ends for clearing away waste trimmed from the material during operation of the gang, said clearing devices each comprising an arm mounted rotatively upon the shaft and a dough-clearing scraper blade carried by said arm in substantial parallelism with the axis of the shaft and displaced radially from said axis at a distance suitable for scraping the lateral margins of the dough holder.

PAUL KELLNER.